INVENTORS
WAYNE A. MCRAE
DANIEL L. BROWN
STUART G. MCGRIFF
BY, Norman E. Saliba
ATTORNEY

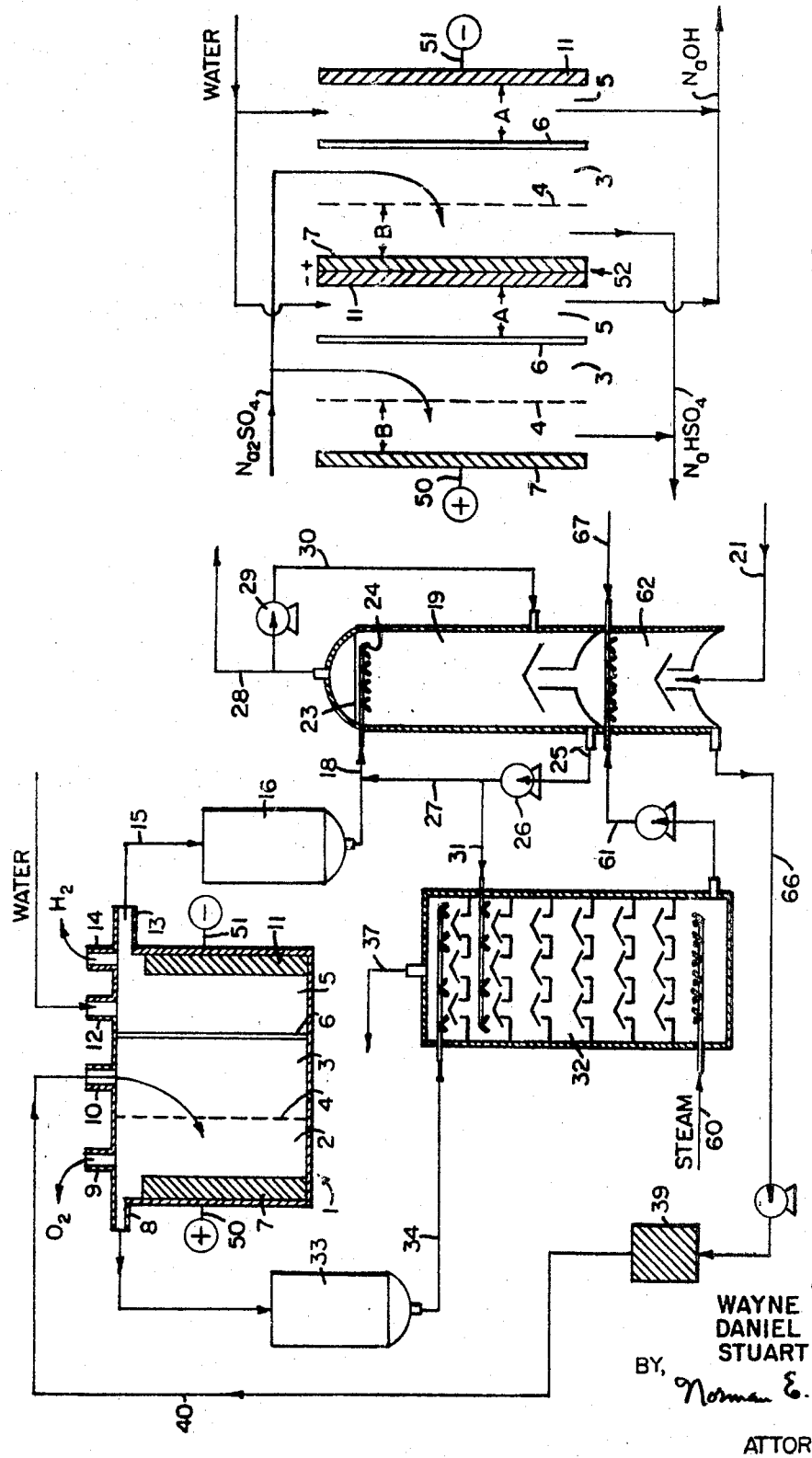

United States Patent Office 3,475,122
Patented Oct. 28, 1969

3,475,122
RECOVERY OF SULFUR DIOXIDE FROM GAS STREAMS
Wayne A. McRae, Lexington, and Daniel L. Brown, Wayland, Mass., and Stuart G. McGriff, Alexandria, Va., assignors to Ionics, Incorporated, Watertown, Mass.
Filed Mar. 22, 1967, Ser. No. 625,149
Int. Cl. C01b *17/56*
U.S. Cl. 23—178         10 Claims

ABSTRACT OF THE DISCLOSURE

This is a cyclic process for the removal and recovery of sulfur dioxide from waste stack gases to lessen atmospheric pollution. The process involves (a) electrolytically converting a salt solution into an acid and base;
(b) employing the base to absorb the sulfur dioxide from the waste gas;
(c) neutralizing the resulting spent base with the electrolytically produced acid to reform the original salt solution and to release the absorbed sulfur dioxide gas, and
(d) recycling the salt solution to the electrolytic cell and recovering sulfur dioxide gas.

---

Figure 1:
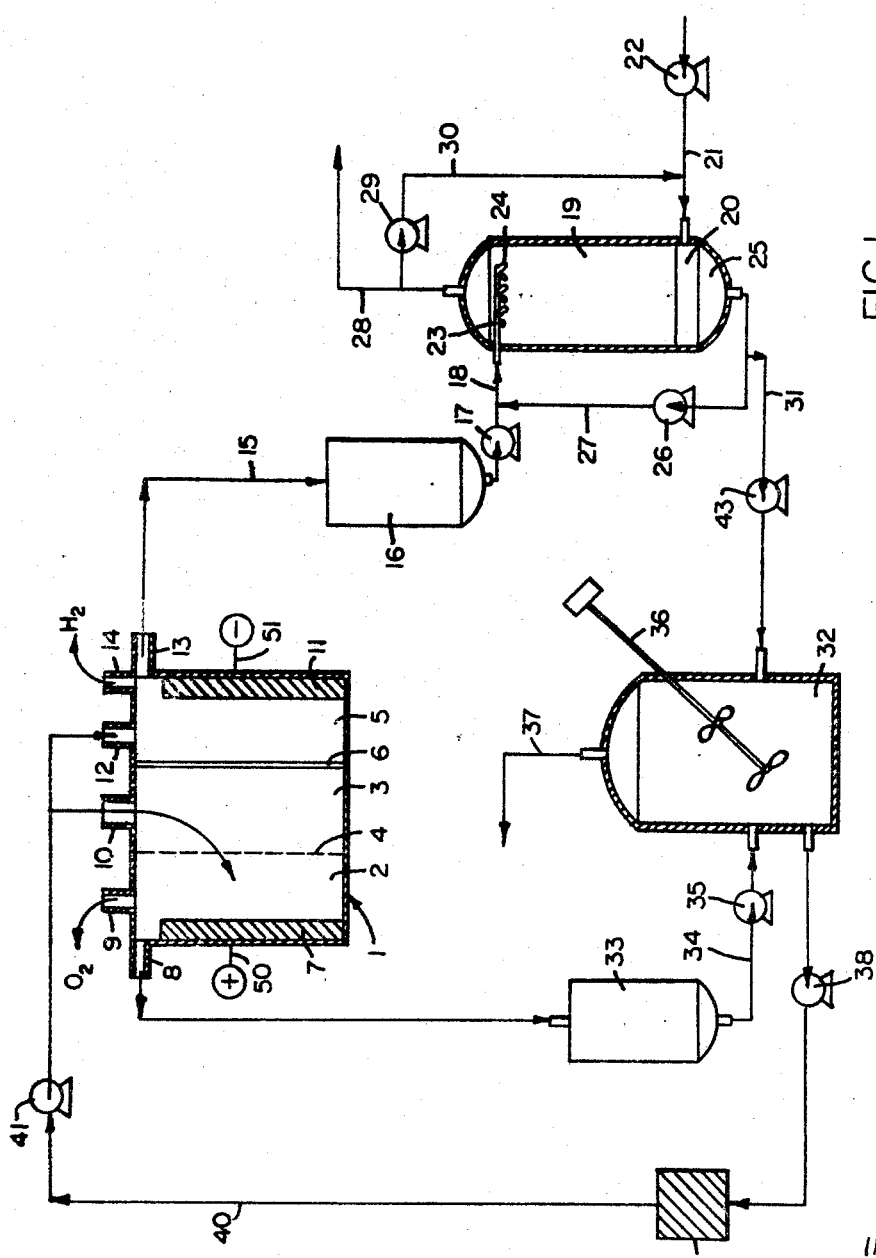

This invention is concerned with a method for the recovery of salt-forming gases from gaseous streams and in particular to the removal and recovery of acidic gases from waste gases. It relates specifically to the selective recovery of sulfur dioxide from a more or less arid gas stream which may also contain other acidic gases.

Sulfur dioxide ($SO_2$) is a component of many gaseous effluents such as flue gases (boiler and furnace exhausts), smelter gases, off-gases from chemical and petroleum processes, and stack gases produced from burning sulfur-containing hydrocarbon fuels, such as oil, sour natural gas and coal. Pollution of the atmosphere by sulfur dioxide has been a problem for many years due to its noxious effect on human, animal and plant life, and on metals and other materials. Many methods have been proposed for removing sulfur dioxide from gaseous effluents. One such process is based on the oxidation of $SO_2$ to $SO_3$, employing a catalyst such as vanadium pentoxide. The $SO_3$ is subsequently recovered as sulfuric acid. For its application to flue gas from the combustion of coal or hydrocarbons, the process requires the use of a high temperature electrostatic precipitator to remove fly ash so as not to plug the catalyst bed. The high water content of flue gas generally results in the formation of dilute acid, for example, 70% sulfuric acid as a final product, requiring costly corrosion resistant equipment. The product of 70 percent acid is difficult to market without expensive concentration to 96 to 98 percent acid. Another process utilizes alkalized alumina. An alkali metal oxide is supported on spheres of alumina. The $SO_2$ from the flue gas is absorbed on the spheres in free fall. The spent absorbent is regenerated by heating to a high temperature, for example, 1200° F. with a reducing gas. The disadvantage of this process is that the absorbent loses activity and degrades during repeated regeneration cycles. A third process utilizes activated charcoal. Sulfur dioxide in the flue gas is oxidized to $SO_3$ and adsorbed with endogenous water on the charcoal to form sulfuric acid. The charcoal with its adsorbed acid is regenerated by heating to about 700° F. This process suffers from the degradation of the charcoal at the regeneration temperatures and the corrosion of the structural materials in the regeneration and adsorber apparatus. The prior art processes are expensive and inefficient, especially when the $SO_2$ concentration in the gas is less than 1 percent. Other objections to certain processes are the lack of practical ways, first of ultimately disposing of the $SO_2$ pollutant or of recovering it in a useable form and second, of regenerating the absorbent material for re-use. The dry processes employed for $SO_2$ elimination have serious disadvantages in that there is slow penetration of the $SO_2$ into the solid absorbent resulting in the reaction of only a small portion of the absorbent material. Further, it is difficult to regenerate the absorbents due to fouling of the surface of the solid by dust in the gas. Processes employing liquid-scrubbing solutions, such as ammonia or various amines, although technically feasible, have not been adopted because of the high cost involved in the initial chemical and its subsequent regeneration.

It is therefore the object of this present invention to provide an improved cyclic electrolytic process for the liquid absorption of salt-forming gases, especially $SO_2$ from gas streams in which they occur and their subsequent release and recovery by neutralization of the absorbing material.

Another object is to provide a process that removes $SO_2$ at high percent efficiencies simultaneously with removal of heat, dust and/or fly ash particles contained in the gas.

Another object is to recover the salt-forming gases in a commercially useful and salable form.

Another object is to provide substantially complete and ready regeneration of the absorbent material without the use of high temperature or outside chemical.

A further object is to provide a process having low equipment cost, simplicity and dependability.

Various other objects and advantages will appear from the following disclosure and the novel features will be particularly pointed out hereafter in connection with the appended claims.

In general, the invention as disclosed herein comprises a continuous self-regenerating liquid-phase absorption system employing a novel combination of four basic steps for controlled stack gas purification. The first step involves the electrolytic conversion of an ammonium or alkali metal sulfate salt into its corresponding acid and base. The second step involves the absorption of sulfur dioxide from the gas stream into the aqueous basic solution (caustic) to form predominately bisulfite solution. The third step is directed to neutralizing the spent caustic containing the bisulfite with the electrolytically produced acid to reform the original alkali metal salt and recover the sulfur dioxide. In the fourth step, this salt solution is reclarified and recycled with or without concentration or dilution as feed to the electrolytic cell and again electrolytically converted to the acid and base. During the neutralization step, the $SO_2$ is desorbed from the spent caustic and is collected as a valuable chemical which, for example, may be ultimately converted to sulfuric acid by well known processes. Where the stack gas also contains $CO_2$, the $SO_2$ being a stronger acidic gas will be removed in preference to the $CO_2$. Since equivalent amounts of acid and base are inherently generated by the cell, there is no chemical disposal problem. Water may be required to make up for evaporation and for losses due to the electrolytic decomposition of water into oxygen and hydrogen gases.

The principles and features of the invention are readily understood when taken in connection with the accompanying drawings by considering the basic steps for practicing the same. It is understood that details may be modified or varied without departure from the principles of the invention. The drawings are schematic diagrams of apparatus illustrating generally the flow of materials and treatment thereof. For the purpose of simplicity the various valves, flowmeters, pressure gauges, switches, pumps, etc. which one skilled in the art might employ in the practice of the present invention are not all fully illustrated in the drawings.

The process for carrying out the invention will be described by way of example by reference to the apparatus shown schematically in FIGURE 1 and in particular to the employment of potassium sulfate as the electrolyte feed solution to the electrolytic cell. In the practice of the invention, a feed solution of potassium sulfate is passed from line 40 by pump 41 to the electrolytic cell 1 and by means of a source of direct current passed to the cell through leads 50 and 51 (source not shown) the potassium sulfate is split, resulting in the formation of sulfuric acid and potassium hydroxide. The electrolytic cell is preferably of the type having three compartments, wherein the partition between the anode compartment 2 and the center compartment 3 is a diaphragm 4 of controlled porosity. Between the cathode compartment 5 and the center compartment 3 there is preferably a cation-permselective membrane 6. The cation membrane prevents bulk mixing of the center and cathode compartment solutions. If desired, the cation permselective membrane can be replaced with a second controlled porosity diaphragm. The non-permselective diaphragm 4 is of a design that will allow passage of electrolyte solution therethrough but restrict flow of gaseous anodic products, such as oxygen. The diaphragm is preferably of such suitable acid-resistant microporous materials as, for example, rubber, ceramic, polyethylene, canvas, asbestos, Teflon and other synthetic fabrics, as will be more fully discussed below.

The cation permselective membrane is commonly of the type consisting of cations exchange substance prepared in the form of thin sheets; said membranes being substantially hydraulically impermeable to water and to ions carrying a negative charge but permeable to ions carrying a positive charge. The art contains many examples of cations exchange materials which can be formed into cation permselective membranes.

The anode compartment is provided with an acid resistant anode 7 (for example, lead, chilex, a tungsten bronze, platinum or platinum-coated electrolytic valve metals), as will be more fully set forth below, an outlet 8 for the anolyte effluent product and outlet 9 for gaseous anodic products such as oxygen. The center compartment contains an inlet 10 through which the electrolyte feed solution is introduced.

The cathode compartment 5 defined from the center compartment 3 by the cation membrane 6 is provided with a caustic resistant cathode 11 such as copper lead, nickel, iron or steel and an inlet 12 through which electrolyte or water is passed. Outlet 13 serves to withdraw the caustic catholyte effluent product, and outlet 14 removes gaseous cathodic products such as hydrogen. The diaphragm, membrane and electrode components may be separated from each other by thin, gasketed spacers (not shown) which form the fluid-containing compartments of the cell.

In operation, a solution of an electrolyte, for example, sodium sulfate or potassium sulfate is introduced under pressure into the center compartment through inlet 10 at a rate and pressure which in its passage through the porous diaphragm (as shown by the arrow) is sufficient to substantially prevent the hydrogen ions formed at the anode from migrating to the cathode in competition with the passage of alkali metal cations into said cathode. Simultaneously, electrolyte (or preferably water, as will be more fully discussed) is passed into the cathode compartment via inlet 12 at a rate depending on the concentration of caustic desired in the catholyte effluent product and on the impressed direct current employed. Under the influence of an impressed direct electric current, the cationic constituents of the electrolytic solution in the center compartment, for example, potassium ions, pass through the cation permselective membrane into the cathode compartment. The combination of such alkali metal ion with hydroxyl ions produced at the cathode by the electrolysis of water forms the corresponding hydroxide, for example, potassium hydroxide. This catholyte product is withdrawn through outlet 13 in a concentration dependent upon the current employed and the rate of liquid flow into the cathode compartment. The electrolytic solution in the center compartment 3 now having been partially depleted of its positive ions (e.g. potassium) passes through the porous diaphragm into the anode compartment where combination of its free anionic groups (e.g. $SO_4^=$) with hydrogen ions produced by the electrolysis of water at the anode forms the corresponding acid, for example, sulfuric acid or potassium bisulfate. The anolyte is withdrawn through outlet 8 as a mixture of the original unreacted salt and its corresponding acid. In the case, for example, wherein 50% of the potassium ions of a potassium sulfate solution are effectively transferred to the cathode compartment, the resultant anolyte effluent product will be a equimolar solution of sulfuric acid and potassium sulfate.

The processes may be more clearly understood with reference to the following series of equations wherein the electrolytic salt employed is potassium sulfate:

(1) At the cation exchange membrane 6:

$K^+$ [Center Compartment] → $K^+$ [Cathode Compartment]

(2) At the cathode 11:

$$H_2O e^- \leftrightarrow OH^- + \tfrac{1}{2} H_2(g)$$

$$K^+ + OH^- \leftrightarrow KOH$$

(3) At the diaphragm 4:

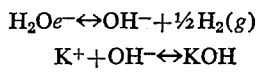

$K^+ + SO_4^= $(excess) [Center Compartment] →
$K^+ + SO_4^=$ (excess) [Anode Compartment]

(4) At the anode 7:

$$H_2O \leftrightarrow \tfrac{1}{2} O_2(g) + 2H^+ + 2e^-$$

$$SO_4^= + 2H^+ \leftrightarrow H_2SO_4$$

Application of these processes toward the electrolysis of inorganic salts, for example, potassium sulfate, sodium sulfate, ammonium sulfate, sodium nitrate and potassium nitrate, whose corresponding acids are strongly acidic, results in the production of an anolyte effluent product comprising a mixture of such acid with the original inorganic salt, the ratio between the two constituents being determined by the rate at which the electrolytic feed solution is introduced into the center compartment and the impressed current to the cell. The flow rate of the electrolytic solution may be regulated so that the acid and original salt content of the anolyte product is of any desired value. For example, in the case of potassium sulfate, the flow of an aqueous solution of the same into the center compartment may be regulated so that the anolyte effluent product is equivalent in acid and potassium sulfate. The effluent caustic product from the cathode compartment containing any unconverted salt is passed via line 15 into the optional caustic hold-up tank 16, subsequently withdrawn by pumping means 17 and passed through line 18 into the top of the absorber or scrubber tower 19 which may be, for example, a conventional counter-current packed tower or a spray tower. Simultaneously with the flow of caustic, a gas stream containing $SO_2$ and/or other salt-forming gases is introduced into the bottom of the tower at 20 through inlet gas line 21 by means of optional gas inlet pump 22 or other pumping means. The waste gas is preferably passed upwardly in counter-current flow to the caustic solution which enters the top of the tower at 23. The caustic may, for example, be sprayed downwardly therein in the form of small droplets by a series of nozzles 24. The tower may instead contain bubble trays to bring about intimate contact of the gases and the caustic scrubbing solution. The tower may alternately be packed with ceramic or plastic materials having the shape of rings, saddles, tellerettes, etc. Packed column absorbers are best operated counter-currently so as to allow contacting the less contaminated gases with the most avid liquid-absorbing material. The descending caustic will absorb acidic substances such as $SO_2$, $SO_3$, $CO_2$ and $NO_2$, and small particulate matter, such as fly ash, and then collect in the bottom of the tower at 25. The tower can be designed so that the caustic solution makes a single downward pass through the absorber. To improve the performance of the scrubber, the caustic can be continuously recirculated therethrough by pumping means 26, a portion of the liquid being removed from the bottom of the tower and returned to inlet line 18 by means of return or recycle conduit 27. This recirculation provides continuous contact with the upwardly moving gas. The depleted gas, after passing upwardly through the tower, is removed from the tower at gas exit line 28. Where a single pass of the laden gas is not sufficient to remove the desired percentage of sulfur dioxide, part of the gas may be recycled by a pump 29 back to the bottom of the tower for further scrubbing by way of return conduit 30. Preferably, at least 80% $SO_2$ removal should be accomplished in a single pass or by recycling.

The spent or exhausted caustic solution is continuously bled from the absorber, carried away from the tower by outlet 31 and passed into the neutralizer, desorber, stripper or regeneration tank 32 by pumping means 43. Caustic from the electrolytic cell is passed into the absorber to make up for the spent caustic removed. It is preferred that the spent caustic leaving the tower be largely converted to an alkali metal bisulfite through the absorption of $SO_2$ gas by the caustic solution, thereby preventing the absorption of substantial quantities of gases such as carbon dioxide which are less acidic than sulfur dioxide. It is preferred that at least 50% of the available hydroxyl capacity for $SO_2$ absorption in the caustic be utilized in the absorber in accordance with the following reaction:

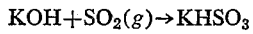
$$KOH + SO_2(g) \rightarrow KHSO_3$$

The solution of spent caustic (and any unreacted caustic) entering the neutralizer tank will mix with and become neutralized by the anolyte solution which is sufficiently acidic to stoichiometrically regenerate the electrolyte, e.g., potassium sulfate. The acidic solution, initially obtained from the anode compartment of the electrolytic cell, is optionally stored in an anolyte hold-up tank 33 and passed via line 34 into the neutralizer tank by gravity or pumping means 35.

The mixture in the neutralizer may be stirred, if desired, by mixing means 36 with sufficient space and time being allowed for disengagement of the liberated $SO_2$. The neutralization reactions occurring therein are as follows:

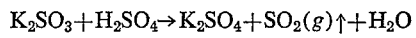
$$K_2SO_3 + H_2SO_4 \rightarrow K_2SO_4 + SO_2(g)\uparrow + H_2O$$

$$2KHSO_3 + H_2SO_4 \rightarrow K_2SO_4 + 2SO_2(g)\uparrow + 2H_2O$$

The overall result is the regeneration of the original electrolytic solution accompanied by the release of a concentrated stream of gaseous $SO_2$ at exit line 37. The $SO_2$ gas collected can be purged from the stripper with steam, vacuum or essentially the stoichiometric amount of air and ultimately converted to sulfuric acid. The regenerated solution of alkali metal sulfate or other salt is passed by a pump 38 through particle removing means such as a filter 39 prior to being returned as a feed solution to the electrolytic cell. Sedimentation, filtration, centrifugation, or other means of removing fly ash or particulate matter from the regenerated alkali metal sulfate solution prior to its recycle back to the cell is desirable to minimize plugging of the porous diaphragm of the electrolytic cells.

The recovery of $SO_2$ by suitable contact of an $SO_2$ containing gas phase with the aqueous caustic solution is both rapid and efficient. The $SO_2$ removal rate will of course depend on the size and type of the scrubber, the temperature, concentration and volume of the caustic employed, the absolute pressure, flow rates of caustic and gas, $SO_2$ content of the gas phase, percent $SO_2$ removal, type of caustic employed (for example, whether potash or soda) concentration of other electrolytes in the caustic, etc.

Analyzers may be employed to continuously record and monitor the $SO_2$ level of the scrubbed gas effluent from the tower. The caustic solution can also be employed effectively to remove nitric oxide, nitrogen dioxide, hydrogen sulfide, mercaptans and similar noxious gases that may be present. It is understood that the invention disclosed herein may be similarly applied to the removal of acidic sulfur contaminants of $SO_2$, $SO_3$, $H_2S$ and mercaptans from natural gas and petroleum fluids such as gasoline to produce a sweet product.

Figure 2:
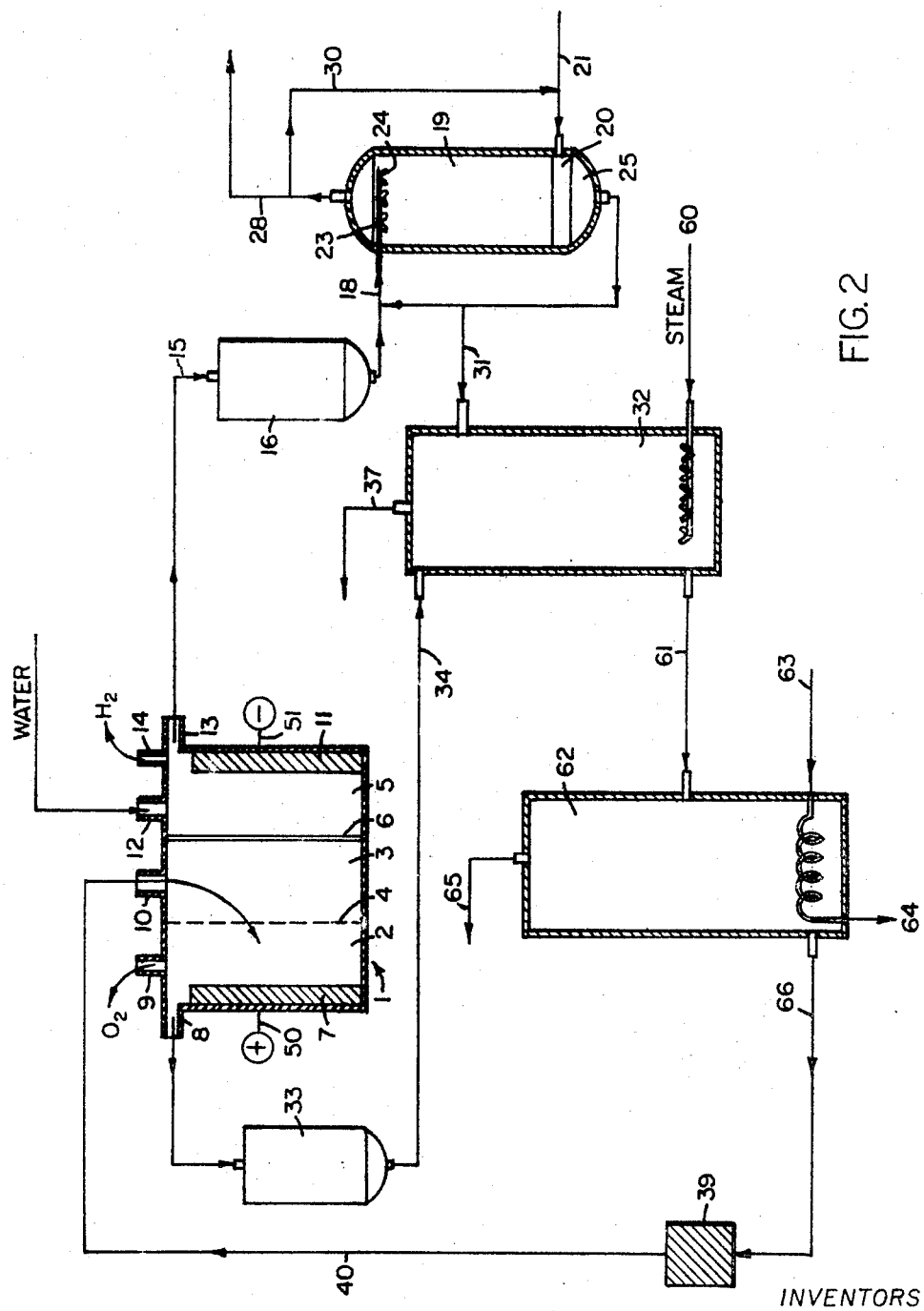

The process described in connection with FIGURE 1 is particularly economical for recovering sulfur dioxide from relatively small flows of sulfurous gases, for example, from 1 to 100 standard cubic feet per second. For such flows simplicity of operation is of great importance and the cost of scrubbing towers is relatively small. The process as described suffers from having a mass absorption coefficient in the tower (usually referred to in chemical engineering treatises as $K_Ga$) which is less than that obtainable with pure caustic owing to the presence in the caustic of unconverted salt. The absorption tower must therefore be larger than would be required for pure caustic. On the other hand, the system is closed, that is, it is not necessary to add or remove any substantial quantity of water or salt except to make up for any evaporation in the absorption tower and the neutralizer. This simplicity is a distinct advantage for small plants. However, for larger plants, generally those processing more than 100 standard cubic feet of gas per second, there are economic advantages to producing pure caustic in the electrolytic cell. This results first in a substantial reduction in the size of the absorption tower but also in the necessity of using an open cycle process in which water is added to the catholyte of the electrolytic cells and removed from the liquid effluent from the neutralizer, desorber, stripper or regenerator. This open cycle process will be described by way of example by reference to the apparatus shown schematically in FIGURE 2 and in particular to the employment of sodium sulfate as the electrolyte feed solution to the electrolytic cell. In FIGURE 2 equipment items which have the same function as those in FIGURE 1 are similarly numbered. In the process of FIGURE 2, a feed solution of sodium sulfate is passed from line 40 by pumping means (not shown) to the electrolytic cell 1. By means of a source of direct current passed to the cell through leads 50 and 51 (source of current is not shown) the sodium sulfate is split into sodium hydroxide and a mixture of sulfuric acid and sodium sulfate referred to herein as sodium acid sulfate or sodium bisulfate. The electrolytic cell is preferably of the type described in connection with FIGURE 1 or FIGURE 4. The catholyte compartment 5, defined from the center compartment 3 by the cation membrane 6 is provided with a caustic resistant cathode 11, such as copper, lead, nickel, nickel alloy, iron or steel and an inlet 12 through which water is passed. The flow of water and electric current are regulated to give the desired caustic concentration, preferably between 20 and 200 grams of caustic per liter, which is withdrawn from the cell through the outlet 13.

In operation a solution of sodium sulfate, preferably in the range of about 30 to 300 grams per liter, is introduced under pressure into the center compartment through inlet 10 at a rate and pressure which in its passage through the porous diaphragm is sufficient to prevent the hydrogen ions formed at the anode from migrating to the catholyte. Simultaneously water is passed into the cathode compartment via inlet 12 at a rate depending upon the concentration of caustic desired in the catholyte effluent product and on the impressed direct electric current. Under the influence of the electric current, sodium ions pass through the cation selective membrane into the catholyte and combine with hydroxide ions produced by the electrolysis of water at the cathode. The solution in the center compartment 3, at least partially depleted of sodium, passes through the porous diaphragm into the anode compartment where combination of the sulfate anions with hydrogen ions produced by the electrolysis of water at the anode forms the corresponding acid, that is, sodium acid sulfate and/or sulfuric acid. The anolyte is withdrawn through outlet 8 as a mixture of unreacted salt, if any, and acid.

The effluent product from the cathode compartment is passed through line 15 into the optional caustic surge tank 16 and then through line 18 by optional pumping means (not shown) or gravity into the absorber or scrubbing tower 19. A gas stream containing $SO_2$ is introduced into the tower at 20 through inlet 21. The gas after passing through the tower is removed at exit line 28 at least partially depleted in sulfur dioxide. It is preferred to remove from 80 to 99 percent of the sulfur dioxide content.

The rich electrolyte containing absorbed sulfur dioxide in the form of sodium sulfite and/or bisulfide is carried from the tower through outlet 31 and passed into the neutralizer, (desorber, stripper or regeneration) tank 32 and there mixed with and neutralized by the acidic solution obtained from the anode compartment of the electrolytic cell. The anolyte is stored in anolyte surge tank 33 and passed through line 34 into the stripper tank 32. The result is the regeneration of the sodium sulfate accompanied by the release of a concentrated, humid stream of gaseous sulfur dioxide through exit 37. The sodium sulfate leaves the stripper through line 61 and is preferably stripped substantially free of sulfur dioxide by injecting live steam through inlet and sparger 60.

It will be clear that all of the water which is introduced into the catholyte at 12 and the sparger at 60 occurs in the effluent sodium sulfate solution except for that lost in the gas effluent lines 28 and 37. This water must be removed, for example, by evaporator 62 before the sodium sulfate is recycled to the electrolysis cell. The evaporator is preferably of the multiple effect, flash or vapor recompression type. Steam or other heat exchange media is introduced at inlet 63 and issues at exit 64. Water vapor or liquid water substantially free of sodium sulfate issues at 65. Alternatively, the sodium sulfate may be concentrated by employing reverse osmosis of electrodialysis processes. The regenerated sodium sulfate solution is passed through clarification means 39 prior to passage as feed solution to the electrolytic cell.

A preferred method of concentrating the sodium sulfate effluent from the stripper 32 is shown schematically in FIGURE 3 in which equipment items have the same function as those similarly numbered in FIGURES 1 and 2. The rich electrolyte containing absorbed sulfur dioxide in the form of sodium sulfite and/or bisulfite is carried from the absorption tower 19 through outlet 31 and passed into the neutralizer or stripper tank 32 and there mixed with and neutralized by the acidic solution obtained from the anode compartment of the electrolytic cell. The result is the regeneration of the sodium sulfate accompanied by the release of a concentrated, humid stream of gaseous sulfur dioxide through exit 37. The sodium sulfate solution is less concentrated than that fed into the central compartment 3 of the electrolytic cell since it comprises, in addition, substantially that water introduced into the catholyte compartment 5 through entrance means 12. The sodium sulfate leaves the stripper tank 32 through line 61 and is preferably stripped substantially free of sulfur dioxide by injecting live steam through inlet and sparger 60. The excess water is removed by leading the effluent dilute sodium sulfate solution through line 61 to the humidifying chamber 62 wherein it contacts the influent sulfurous gas stream entering at 21. Generally, the latter is at an elevated temperature, for example, 300 to 400° F., and is not saturated with water vapor. In the humidifying chamber 62, therefore, part of the water in the dilute sodium sulfate solution will be evaporated and a suitably concentrated solution can be withdrawn through line 66 and, after removal of solid matter in clarifier 39, can be recycled to the electrolytic cell. Simultaneously, the sulfurous gas stream will be partially cooled and humidified and will pass to the absorption tower 19 for recovery of sulfur dioxide. For many sulfurous gases, the excess water content of the dilute sodium sulfate solution will not be sufficient to humidify the gas stream and if this is the case then either part of the gas stream must be by-passed around the humidifying chamber to the absorber or additional water or stream must be injected through line 67. If the liquid in the absorption tower 19 is comparatively dilute, then it is preferred to by-pass part of the gas stream around the humidifying chamber. If the liquid in tower 19 is comparatively concentrated, then it is preferred to inject extra water or steam into the humidifying chamber.

The invention has been described schematically in connection with a single three-compartment electrolytic cell. It will be understood that for practical applications, a multiplicity of such cells will be required. A particularly advantageous multicell configuration is shown in FIGURE 4 utilizing bimetallic, bipolar electrodes in which 7 are anodes, for example, of antimony-lead, silver-lead, calcium-lead, Chilex, a tungsten bronze, platinum or platinum-plated titanium, zirconium, niobium or tantalum. The anodes perferably have a thickness in the range of 0.01 to 0.3 centimeter.

The microporous diaphragms 4 have a void volume of at least 50 percent, a thickness in the range of 0.1 to 1.0 millimeter and an average pore size in the range of 10 to 100 microns.

Preferred materials of construction for diaphragms are rubber, including synthetic rubber, ceramics, polyethylene, polypropylene, ethylene-propylene copolymers and terpolymers, polyvinyl chloride, polyvinyl acetate, copolymers of vinyl acetate and viny chloride, copolymers of ethylene and vinyl acetate, polyvinylidene chloride, copolymers of vinylidene chloride and vinyl chloride, polyacrylonitrile, copolymers of acryonitrile and vinyl chloride, nylon, wool, copolymers of styrene and butadiene, cellulose, regenerated cellulose, cellulose acetate, burlap, canvas, asbestos, polytetrafluoroethylene, polyvinylidene fluoride, ployvinyl fluoride, polychlorotrifluoroethylene, epoxy-bonded glass fiber mats, poleyster bonded glass-fiber mats, polystyrene bonded glass fibers and the like. The cation selective membranes 6 have a water content in the range of 10 to 40 percent of the dry weight, a cation exchange capacity of 1 to 10 milliequivalents per gram of dry weight, a thickness in the range of 0.1 to 1.0 millimeter, pore sizes of less than 0.1 micron, an areal resistance in equilibrium with 1 molar sodium hydroxide of not more than 10 ohm $cm.^2$ at the operating temperature of the cell, a transport number for sodium ion of at least 0.5 when in equilibrium with 1 molar sodium hydroxide, a Mullen A burst strength of at least 30 pounds per square inch. Suitable materials are crosslinked polystyrene sulfonate salt, crosslinked polyethyl styrene sulfonate salt, crosslinked copolymers of ethyl styrene sulfonate salt and styrene sulfonate salt, sulfonated crosslinked polystyrene, sulfonated crosslinked polyethylstyrene, sulfonated crosslinked copolymers of styrene and ethyl styrene, sulfonated crosslinked polymers of vinyl toluene, sulfonated crosslinked copolymers of vinyl toluene and ethyl styrene, crosslinked polyacrylate salts, crosslinked polymethacrylate salts, crosslinked copolymers of acrylate and methacrylate salts, crossinked copolymers of styrene and maleate or fumarate salts; also, the phosphates, arsenates, molybdates, vanadates, niobates, chromates, manganates, tantalates and/or tungstates of titanium, zirconium, hafnium, tin, thorium, lead and/or cerium. The inorganic materials are bonded with film-forming organic and inorganic materials. Other cation exchanging substances may also be used.

The cathodes 11 preferably have a thickness in the range of 0.01 to 0.30 centimeter and consist of lead, antimony-lead, silver-lead, calcium-lead, Chilex, a tungsten bronze, copper, nickel, nickel-alloys, cadmium, tin, Monel, bronze, brass, aluminum silver, graphite or gold, platinum or palladium plated titanium, zirconium, or niobium.

The interior electrodes, such as 52, as preferably bipolar and are advantageously bimetallic. Thus the interior electrodes may for example be titanium sheets each face of which is coated with from 0.25 to 2.5 microns of platinum or other noble metal. Alternatively, the electrodes may be a tungsten bronze or a lead alloy. Preferred bimetallic, bipolar interior electrodes include those in which the cathode surface 11 is nickel and the anode surface 7 is platinum or platinum-plated tantalum or niobium. It has been found that for best results the distance A between the cathode surface 11 and the adjacent surface of the cation selective membrane 6 should be in the range of 0.5 to 5 millimeters and the current density should be in the range of 50 to 250 milliamperes per square centimeter. If the current density is less than 50 milliamperes per square centimeter, then the flow rates required to achieve satisfactory concentrations of caustic will be so low that some regions of the catholyte will be comparatively stagnant and the current efficiency will decrease, apparently because the caustic concentration has been excessive in such regions. On the other hand, if the current density is in excess of 250 milliamperes per square centimeter, then it is found that the useful life of the cation selective membranes decreases substantially, possibly due to excessive heat generation in the bulk of the membrane, perhaps coupled with non-uniform current distribution caused by gas-binding. If the cathode-membrane spacing A is less than 0.5 millimeter, then gas-binding interferes substantially with the flow of electric current and may result in rapid fluctuation of the current. If the cathode-membrane spacing A is greater than 5 millimeters, then the flow rates to achieve satisfactory concentrations of caustic will result in linear velocities which are so low that some regions of the catholyte will be comparatively stagnant with the results described above. It has been found that if the membrane 6 is less than 0.1 millimeter thick, it will have a tendency to bow either toward or away from the cathode in either case resulting in non-uniform flow in the cathode, stagnation, gas-binding and non-uniform distribution of the current. On the other hand, if the membrane is thicker than 1.0 millimeter, then the useful lifetime of the membrane is reduced, apparently because it is difficult to remove from the interior of the membrane the heat generated at the high current densities employed. If the pore sizes in the cation selective membane 6 are in excess of 0.1 micron, then hydraulic flow through the membrane become excessive, caustic can be lost from the catholyte into the central compartment 3 and from the latter into the anolyte resulting in a loss of current efficiency. Further control of the flow of electrolyte from the central compartment 3 into the anolyte through the porous diaphragm is very difficult when the average pore size of the cation selective membrane is greater than 0.1 micron. At high pressures, part of the electrolyte will flow through the cation selective membrane into catholyte. At low pressures, part of the catholyte may flow through the cation selective membrane into the central compartment resulting in a loss of current efficiency. The spacing B between the anode 7 and the adjacent diaphragm surface 4 should be in the range of 0.5 to 5.0 millimeters for the reasons discussed in connection with the cathode-cation membrane spacing. If the diaphragm is thicker than 1.0 millimeter, then the pressure required to force th electrolyte through the diaphragm will result in excessive bowing of the cation selective membrane with the effects on catholyte stagnation and catholyte stagnation and current distribution discussed above. If the diaphragm is less than 0.1 millimeter thick, it will tend to bow either toward or away from the anode, in either case resulting in non-uniform anolyte and current distribution, in reduced current efficiency and in decreased anode and diaphragm life. If the electrolyte in the central compartment 3 has a concentration of less than 30 grams per liter, the heat generation in the central compartment and in the anolyte wlil be excessive and result in reduced life of the diaphragm and the anode. It appears that the deterioration of the anode at concentrations below 30 grams per liter and at the high current densities required is not solely due to heat effects but may be due to other causes not well understood. If the electrolyte in the central compartment has a concentration greater than 300 grams per liter, at practical conversions the current efficiency in the *catholyte* will be greatly reduced. Similarly, it is found that caustic in the cathode compartment 5 should have a concentration in the range of 0.5 to 5.0 equivalents per liter. If the concentration is less than 0.5 normal, heat generation is excessive and the life of the membrane is reduced. If the concentration is greater than 5.0 normal, the life of the membrane is also reduced in this case apparently owing to some sort of chemical attack and the current efficiency of the *anolyte* is reduced drastically.

The following examples show by further illustration and not by way of limitation the cyclic method of absorbing $SO_2$ and the regeneration of the spent liquid absorbent.

EXAMPLE 1

An array of three electrolytic cells of the general type disclosed and described in connection with FIGURE 4, containing 3 platinum-coated titanium anodes and 3 nickel cathodes is used to convert a 2 normal aqueous solution of sodium sulfate into sodium acid sulfate and sodium hydroxide. The diaphragms are microporous silicone rubber and have a thickness of 0.25 millimeter and are supported on their anode sides by platinum-plated expanded titanium sheet having an expanded thickness of 2 millimeters which thus determines the diaphragm-anode spacing. The void volume of the diaphragm is about 70 percent and the average pore size is about 20 microns. The interior electrodes are bimetallic and bipolar, that is, they consist of a laminate of titanium and nickel. The active surfaces of all the electrodes are scribed to increase the effective surface area and the platinum is plated on the titanium after scribing. The platinum plate is about 50 microinches (1.25 microns) thick. The membrane is a self-supporting carboxylic type cation permselective membrane of the type described in U.S. Patent No. 2,731,-408, prepared from a mixture of divinyl benzene, ethyl styrene and acrylic acid. It has a thickness of 0.7 millimeter, an areal resistance of 2 ohm cm.$^2$ in 1 molar sodium hydroxide at 150° F., a water content of about 20 percent of its dry weight, a cation exchange capacity of about 6.5 milliequivalents per dry gram of resin, average pore sizes of less than 0.1 micron, a transport number for sodium ions of about 0.85 when in equilibrium with 1 molar sodium hydroxide, a Mullen A burst strength of about 80 pounds per square inch and is reinforced with two layers of bonded, non-woven polypropylene mat. The membranes are supported on their cathode sides by expanded nickel sheet having an expanded thickness of 2 millimeters which thus determines the membrane-cathode spacing. The spacing between the diaphragm and the membrane is filled with non-woven bonded polypropylene screen having a thickness of 2 millimeters. The outer edges of the compartments are fitted with high density polyethylene gaskets having a compressed thickness of about 2 millimeters. The sodium sulfate solution is introduced into the central compartments at a rate of 4 liters per hour per active square foot of anode. The current density at the anode and at the cathode is 120 amperes per square foot. The temperature of the cell is maintained at 150° F. by recirculating both the anolyte and the catholyte through heat exchangers. The voltage required is about 15 volts D.C. that is, about 5 volts per cell. At steady state the bleed from the anolyte is found to be essentially sodium bisulfate indicating a current efficiency of about 90 percent. At the cathode, 4 liters of caustic per hour per square foot are removed from the recirculating catholyte stream and the volume is maintained by adding fresh water. At steady state the catholyte bleed is found to have a concentration of about 1 equivalent per liter indicating a current efficiency of about 90 percent. The catholyte bleed is contacted counter-currently with a simulated flue gas stream having the following composition:

| Component: | Volume percent |
|---|---|
| $SO_2$ | 0.3 |
| $CO_2$ | 13.0 |
| $N_2$ | 74.0 |
| $O_2$ | 6.0 |
| $H_2O$ | 6.7 |

The contact is carried out in a column packed with glass Raschig rings. The liquid and the gas flows and the height of the packing are adjusted to remove about 90 percent of the $SO_2$ and give a liquid effluent having an empirical composition corresponding to about 82 mol percent of sodium bisulfite and about 18 mol percent of sodium sulfite. The liquid effluent is mixed with the corresponding amount of anolyte from the electrolytic cell and passed downwardly through a second column packed with glass Raschig rings against an upward stream of air adjusted to give a gaseous effluent having the following range of analyses on a dry basis:

| Component: | Volume percent |
|---|---|
| $SO_2$ | 25–28 |
| $O_2$ | 19–12 |
| $N_2$ | 56–50 | and thus suitable for the manufacture of sulfuric acid using the contact process. Alternatively, the sulfur dioxide may be stripped by injecting steam in the bottom of the packed tower or reducing the pressure in the tower with a mechanical vacuum pump. The sodium sulfate leaving the bottom of the column is concentrated to about 2 equivalents per liter in a multiple effect evaporator. The condensate is used as feed to the catholytes of the multiple electrolytic cell. The sodium sulfate effluent is used as feed to the central compartments of the cell thereby completing the cyclic operation.

EXAMPLE 2

This example simulates the recovery of sulfur dioxide from a hot stack gas using potassium sulfate. The synthetic flue gas of Example 1 is heated to 325° F. in an electrically heated Alundum tube and contacted countercurrently in a third column packed with glass Raschig rings against the downwardly flowing dilute potassium sulfate solution issuing from the second (stripping) column. It is found that to maintain a concentration of 2 equivalents per liter in the liquid effluent it is necessary at steady state either to add some water to the dilute potassium sulfate influent to the column or to the concentrated effluent from the column. Alternatively, part of the sulfurous gas may be by-passed around the tower. Fly ash recovered from a Cotrell precipitator is ground to pass 325 mesh and added with stirring to the resulting potassium sulfate solution at the rate of 200 milligrams per liter to simulate the pickup of fly ash which would occur from the gaseous effluent from a power house. The resulting mixture is allowed to settle and then filtered through diatomaceous earth. The filtrate is sent to the central compartments of the multiple electrolytic cell apparatus of Example 1 which uses silver-lead anodes and copper cathodes. The cation selective membrane is polyvinylidene fluoride bonded zirconium phosphate prepared according to the method of United States Department of the Interior Office of Saline Water Research and Development progress Report No. 148 and has a thickness of about 0.3 millimeter, a cation exchange capacity of about 2.5 milliequivalents per dry gram, an areal resistance of 2 ohm $cm.^2$ in 1 molar sodium hydroxide at 170° F., a water content of about 12 percent of the dry weight, average pore sizes of less than 0.1 micron, a transport number for sodium ions of about 0.85 when in equilibrium with 1 molar sodium hydroxide, a Mullen A burst strength of about 40 pounds per square inch. The membranes are supported on their cathode sides by a perforated, corrugated sheet of polyvinyl chloride having a thickness of about 2 millimeters. The diaphragms are asbestos paper having a thickness of about 0.2 millimeter and are supported on their anode sides by the perforated corrugated polyvinyl chloride sheet referred to above. The void volume of the diaphragms is about 60 percent and the average pore size is about 30 microns. The interior electrodes are bimetallic and bipolar, that is, they consist of a laminate of silver-lead and copper. The spacing between the diaphragm and the membrane is filled with the non-woven bonded polypropylene screen used in Example 1. The gaskets at the edges of the compartments are butyl rubber having a compressed thickness of about 2 millimeters. The potassium sulfate solution is introduced into the central compartments at a rate of 6 liters per hour per active square foot of anode. The current density at the anode and at the cathode is 180 amperes per square foot. The temperature of the cell is maintained at 170° F. by recirculating both the anolyte and the catholyte through heat exchanges. The voltage required is about 23 volts D.C., that is, about 8 volts per cell. At steady state the bleed from the anolyte is found to be essentially potassium bisulfate indicating a current efficiency of about 90 percent. At the cathode, 6 liters of caustic per hour per square foot are removed from the recirculating catholyte stream and fresh water is added continuously to maintain the in-process volume. At steady state the catholyte bleed is found to have a concentration of about 1 equivalent per liter indicating a current efficiency of about 90 percent. The catholyte bleed is contacted countercurrently with the humidified and partially cooled, simulated flue gas stream from the sulfate concentration (third) column. The contact is carried out in a (first) column packed with ceramic Berl saddles. The liquid and the gas flows and the height of the packing are adjusted to remove about 95 percent of the $SO_2$ and give a liquid effluent having an empirical composition corresponding to about 67 mol percent of potassium bisulfite and 33 mol percent of potassium sulfite. The liquid effluent is mixed with the corresponding amount of anolyte from the electrolytic cell and passed downwardly through the second column. Live steam is injected in the bottom of the column to raise the temperature of the liquid effluent to 200° F. The gaseous effluent from the tower is cooled in a partial condenser, the liquid flowing back to the stripping tower. The partially dried sulfur dioxide is dried over silica gel and the $SO_2$ liquefied at −40° F. The potassium sulfate leaving the bottom of the column is sent to the humidifying column thus completing the cycle.

In other experiments in which the void volume of the diaphragm is less than 50 percent, the thickness is not in the range of 0.1 to 1.0 millimeter or the average pore size is not in the range of 10 to 100 microns, it is found that continuous, stable, cyclic operation cannot be achieved. If the void volume is less than 50 percent, the thickness is greater than 1.0 millimeter or less than 0.1 millimeter, or the average pore size is less than 10 microns or greater than 100 microns, the current efficiency in the *catholyte* is substantially less than 100 percent and the life of the cation selective membrane is seriously diminished. In another series of experiments, it is found that if the cation selective membrane has a capacity of less than 1 milliequivalent per dry gram, a thickness of less than 0.1 millimeter, a water content of more than 40 percent, pore sizes greater than 0.1 micron or a transport number for sodium ions which is less than 0.5 when in equilibrium with 1 molar sodium hydroxide, the current efficiency in the *anolyte* is substantially less than 100 percent. It is also found that if the membrane has a water content of less than 10 percent of the dry weight, a thickness greater than 1.0 millimeter, an areal resistance in equilibrium with 1 molar sodium hydroxide of more than 10 ohm $cm.^2$ at the operating temperature of the cell or a Mullen A burst strength of less than 30 pounds per square inch, the useful life of the membrane is reduced to impractical values at practical current densities.

We claim:
1. A cyclic process for the continuous removal of sulfur dioxide from sulfur dioxide containing gases which comprises the steps of:
   (a) partially converting in an electrolytic cell an aqueous salt feed solution selected from the group consisting of potassium nitrate, ammonium sulfate and alkaline metal sulfate salts into its corresponding acid and caustic alkaline solutions and removing said acid and caustic solutions from the anode and cathode areas, respectively, of said cell,
   (b) intimately contacting said $SO_2$ containing gas with said caustic solution to absorb at least a portion of said sulfur dioxide therefrom and to convert at least about half of said hydroxide to bisulfite;
   (c) combining at least a portion of the spent caustic solution resulting from step (b) with acid solution recovered from said electrolytic cell whereby neutralization of the acid and spent caustic results accompanied by desorption and release of sulfur dioxide;
   (d) clarifying and passing at least a portion of the solution resulting from neutralization step (c) back to said electrolytic cell as aqueous feed solution to complete the cyclic process and, further
   (e) collecting the sulfur dioxide released in neutralization (c).

2. The process of claim 1 wherein said aqueous salt feed solution to be converted is passed into at least the center compartment of said electrolytic cell having three compartments, a cathode compartment separated from the center compartment by a cation-selective ion exchange membrane and a spaced fluid-permeable diaphragm separating the center compartment from the anode compartment, maintaining a greater pressure in said center compartment than the pressure in the anode compartment to cause said feed solution to flow from the center compartment through said porous diaphragm into and out of said anode compartment and maintaining a pressure in the cathode compartment substantially equal to that in the central compartment at substantially every point on said membrane.

3. The process of claim 1 wherein the alkaline metal sulfate salt is selected from the group consisting of sodium sulfate, potassium sulfate, lithium sulfate, and mixtures thereof.

4. The process of claim 1 wherein said $SO_2$ containing gas also contains carbon dioxide.

5. The process of claim 1 wherein said $SO_2$ containing gas is not saturated with water vapor.

6. The process of claim 1 wherein the solution resulting from said neutraliaztion step is concentrated to between 30 to 300 grams per liter of salt prior to passage as feed solution to said electrolytic cell.

7. The process of claim 2 wherein a multiplicity of said electrolytic cell is employed containing bimetallic, bipolar interior electrodes.

8. The process of claim 2 wherein water is passed as the feed solution to said cathode compartment.

9. The process of claim 1 wherein the caustic solution is partially recycled in its contact with the $SO_2$ containing gas.

10. A process for the recovery of sulfur dioxide from a substantially arid gas containing the same which comprises the steps of:
   (a) contacting said arid gas with an aqueous salt solution of an alkali metal sulfate in a maner to partially humidify said gas whereby said salt solution becomes concentrated to the range of about 30 to 300 grams of salt per liter;
   (b) clarifying said concentrated salt solution to remove particulate matter therefrom;
   (c) passing said clarified salt solution of alkali metal sulfate into the central compartment of a three compartment electrolytic cell, said central compartment being separated from the anode compartment by a porous diaphragm, at sufficient pressure to cause said salt solution to pass through said diaphragm into the anode compartment;
   (d) passing water into the cathode compartment of said cell;
   (e) passing a direct electric current through such cell;
   (f) regulating the flow of current, water and salt solution to convert at least about 50 percent of such alkali metal sulfate into alkali metal hydroxide, having a concentration in the range of 0.5 to 5.0 normal;
   (g) contacting said alkali metal hydroxide with said partially humidified $SO_2$ containing gas to absorb at least about 80 percent of the sulfur dioxide and convert at least about half of the alkali metal hydroxide into alkali metal bisulfite;
   (h) combining said partially converted alkali metal hydroxide with effluent from the anode compartment of said electrolytic cell to reform said alkali metal sulfate salt solution and at least partially stripping and recovering sulfur dioxide from the resulting solution.

References Cited

UNITED STATES PATENTS 2,768,945   10/1956   Shapiro _____ 23—2 X
3,344,050   9/1967   Mayland et al. _____ 23—4 X E. C. THOMAS, Primary Examiner U.S. Cl. X.R.

23—2; 204—98, 102, 103, 104